US008254697B2

(12) United States Patent
Isard et al.

(10) Patent No.: US 8,254,697 B2
(45) Date of Patent: Aug. 28, 2012

(54) SCALABLE NEAR DUPLICATE IMAGE SEARCH WITH GEOMETRIC CONSTRAINTS

(75) Inventors: Michael Isard, San Francisco, CA (US); Qifa Ke, Cupertino, CA (US); Jian Sun, Beijing (CN); Zhong Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 12/364,090

(22) Filed: Feb. 2, 2009

(65) Prior Publication Data

US 2010/0195914 A1    Aug. 5, 2010

(51) Int. Cl.
*G06K 9/46* (2006.01)
*G06K 9/54* (2006.01)

(52) U.S. Cl. ......... 382/209; 362/195; 362/209; 362/305

(58) Field of Classification Search .......... 382/181, 382/209, 190, 195, 201, 100, 154, 168, 173, 382/176, 276, 155, 159, 103, 217, 218, 219, 382/293, 294, 305
See application file for complete search history.

(56) References Cited

U.S. PATENT DOCUMENTS

| | | | |
|---|---|---|---|
| 5,710,877 | A | 1/1998 | Marimont et al. |
| 5,845,288 | A | 12/1998 | Syeda-Manmood |
| 6,121,969 | A | 9/2000 | Jain et al. |
| 6,173,066 | B1 | 1/2001 | Peurach et al. |
| 6,691,126 | B1 | 2/2004 | Syeda-Manmood |
| 6,711,293 | B1 * | 3/2004 | Lowe ............................ 382/219 |
| 7,043,094 | B2 | 5/2006 | Thomas et al. |
| 7,702,136 | B2 * | 4/2010 | Steinberg et al. ............. 382/118 |
| 7,860,317 | B2 * | 12/2010 | Xie et al. ....................... 382/195 |
| 7,949,186 | B2 * | 5/2011 | Grauman et al. ............. 382/170 |
| 8,086,048 | B2 * | 12/2011 | Naaman et al. ............... 382/225 |
| 8,144,947 | B2 * | 3/2012 | Kletter .......................... 382/124 |
| 2002/0069206 | A1 | 6/2002 | Bergman et al. |
| 2008/0177640 | A1 | 7/2008 | Gokturk et al. |
| 2008/0177764 | A1 | 7/2008 | Kise et al. |

OTHER PUBLICATIONS

Jen-Hao Hsiao, Visual-Word-Based Duplicate Image Search with Pseudo-Relevance Feedback, 2008 IEEE International Conference on Multimedia & Expo, Jun. 23, 2008, Hannover, Germany; http://arserver.iis.sinica.edu.tw/    index.php?action=download&dir=%B4%C1%A5Z%B7%7C%C4%B3%2FICME2008&item=icme08_camera_ready.pdf&order=name&srt=yes.

Ondrej Chum, Web Scale Image Clustering, Large Scale Discovery of Spatially Related Images, May 23, 2008, Center for Machine Perception, Department of Cybernetics, Prague, Czech Republic, http://cmp.felk.cvut.cz/~chum/papers/Chum-TR-08.pdf.

Gerhard Roth, Effective Indexing for Strongly Similar Subimage Retrieval, Fourth Canadian Conference on Computer and Robot Vision, May 28-30, 2007, http://www.scs.carleton.ca/~roth/iit-publications-iti/docs/gerh-50000.pdf.

Zhiwei Li, Improving Relevance Judgment of Web Search Results with Image Excerpts, International World Wide Web Conference, Proceeding of the 17th international conference on World Wide Web, 2008, pp. 21-30, http://www2008.org/papers/pdf/p21-liA.pdf.

* cited by examiner

*Primary Examiner* — Sheela Chawan
(74) *Attorney, Agent, or Firm* — Vierra Magen Marcus & DeNiro LLP (57) ABSTRACT

Methods are disclosed for finding images from a large corpus of images that at least partially match a query image. The present method makes use of feature detectors to bundle features into local groups or bundles. These bundled features are repeatable and much more discriminative than an individual SIFT feature. Equally importantly, the bundled features provide a flexible representation that allows simple and robust geometric constraints to be efficiently enforced when querying the index.

8 Claims, 7 Drawing Sheets

SCALABLE NEAR DUPLICATE IMAGE SEARCH WITH GEOMETRIC CONSTRAINTS

BACKGROUND

Figure 1:
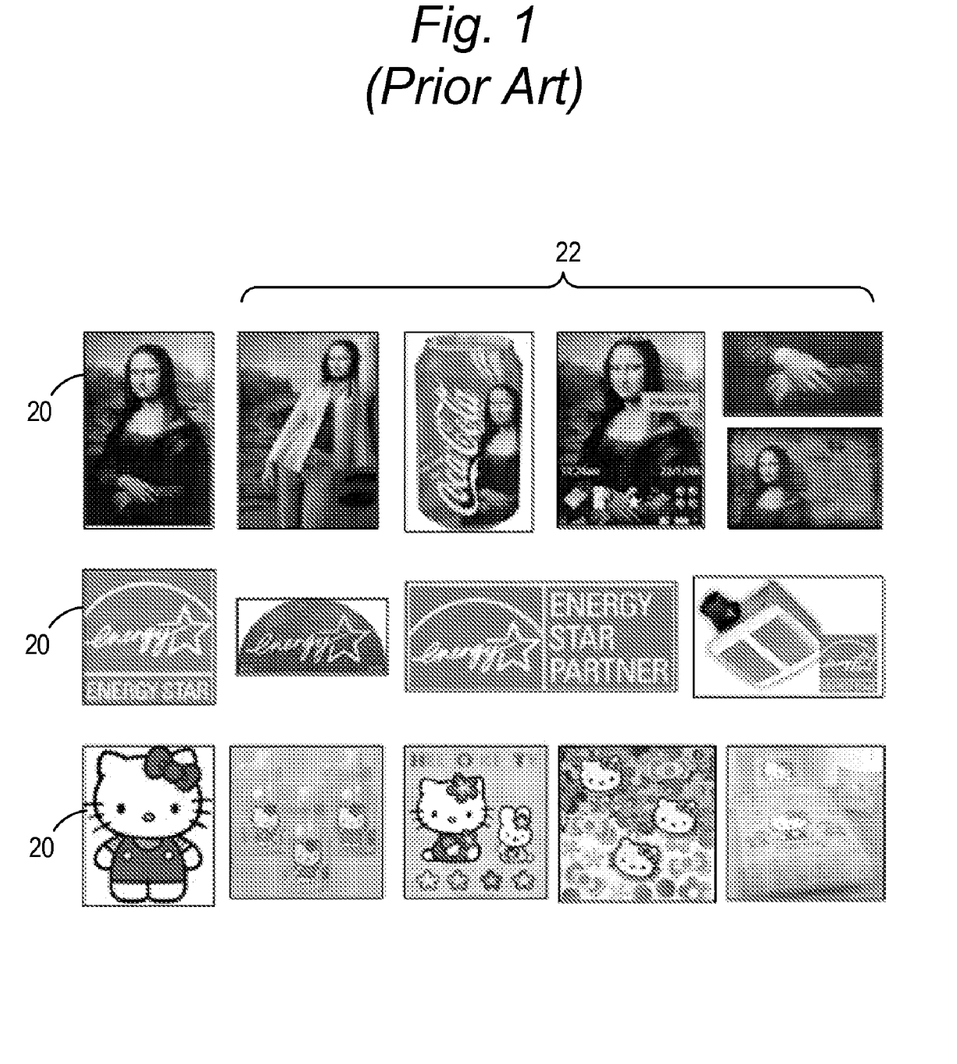
FIG. 1 is a prior art graphic of query images and matching images that are found via a web search using typical image searching methods.

It is often desirable to be able to perform database searches to identify stored images which are the same as, or partial duplicates of, a query image. Applications for such search engines include location of copyright violations, to find better and/or higher resolution duplicates of a query image and to find more information on a query image. While there are many image searching methodologies, one type of image search relates to two-dimensional image searches. Image searching over the World Wide Web is a common example of two-dimensional image searching. A search engine should be able to identify two-dimensional candidate images from a query image, even where the candidates have changes in scale, are cropped differently, or where the query/candidate image is partially blocked (by another image) or only partially duplicated. Prior art FIG. 1 presents examples of two-dimensional searches including query images 20 (on the left), and candidate images 22 which are identified for the respective query images.

Instead of comparing entire query images against entire stored images, current frameworks for two-dimensional image searches process the query and stored images using any of various feature detection schemes. In general, feature detection schemes identify local areas of interest within images, such as for example edges where there is a boundary between two image regions, and corners where for example two edges come together. One popular feature detection scheme is the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," to David G. Lowe, which patent is incorporated by reference herein in its entirety. In general, SIFT feature detection finds distinctive keypoints that are invariant to location, scale and rotation. The SIFT keypoint gains invariance to scale and rotation by exploiting scale-space extrema and the local dominant orientation. In order to detect keypoints, the image is convolved with Gaussian filters at different scales, and then the difference of successive Gaussian-blurred images are taken. Keypoints are then taken as maxima/minima of the Difference of Gaussians (DoG) that occur at multiple scales. This is done by comparing each pixel in the DoG images to its eight neighbors at the same scale and nine corresponding neighboring pixels in each of the neighboring scales. If the pixel value is the maximum or minimum among all compared pixels, it is selected as a candidate keypoint.

In large scale image searches, for example those performed via the World Wide Web, it is necessary to match a single SIFT feature to millions or even billions of SIFT features computed from a large corpus of web images. In this scenario, the discriminative power of the quantized SIFT feature decreases rapidly, resulting in many false positive matches between individual features.

Another popular feature detector is the Maximally Stable Extremal Regions (MSER) algorithm. The MSER algorithm is described for example in the paper by J. Matas, O. Chum, M. Urba, and T. Pajdla, "Robust Wide Baseline Stereo From Maximally Stable Extremal Regions," *Proc. of British Machine Vision Conference*, pages 384-396 (2002), which paper is incorporated by reference herein in its entirety. Unlike the keypoints identified using a SIFT feature detector, MSER detects affine-covariant stable elliptical regions. Usually the MSER detector outputs a relatively small number of regions per image and their repeatability and distinctness are relatively high; that is, if an MSER feature shows up in a query image, it is also likely to be found in the same or similar stored image. However, false positive matches remain an issue for large image databases. The sources of false positives are twofold: 1) each MSER feature is still represented by a single SIFT descriptor no matter how large the region is; and 2) quantization further decreases the discriminative power of the feature.

In order to work with the information provided by feature detectors such as SIFT, existing large scale image retrieval systems typically rely on first quantizing local SIFT descriptors into visual words (see for example, D. Lowe, "Distinctive Image Features From Scale-Invariant Keypoints," *International Journal of Computer Vision,* 20:91-110 (2003), incorporated by reference herein in its entirety). Once the visual words are determined, matches are found by applying scalable textual indexing and retrieval schemes (see for example, J. Sivic and A. Zisserman, Video Google: A Text Retrieval Approach to Object Matching in Videos, *In Proc. ICCV,* (2003), incorporated by reference herein in its entirety). While critical for scalability, quantization has at least two drawbacks. First, modifications to an image patch can lead to its corresponding descriptor being quantized into different visual words. Second, quantization reduces the discriminative power of local descriptors since different descriptors quantized to the same visual word are considered to match with each other even though there may be differences. These two issues reduce the precision and recall in image retrieval, especially for low resolution images.

It is therefore known to employ various geometric verification processes as post-processing steps for getting reasonable retrieval precision, especially for low-resolution images. Such known post-processing geometric verifications are disclosed for example in the papers: H. Jegou, M. Douze, and C. Schmid, "Hamming Embedding and Weak Geometric Consistency for Large Scale Image Search," *In Proc. ECCV* (2008), and J. Philbin, O. Chum, M. Isard, J. Sivic, and A. Zisserman, "Object Retrieval with Large Vocabularies and Fast Spatial Matching," *In Proc. CVPR* (2007).

However, full geometric verification is computationally expensive. In practice, therefore, it is only applied to a subset of the top-ranked candidate images. For large scale image retrievals, such as web image searches, the number of near or partial duplicates could be large, and applying full geometric verification to only these top-ranked images may not be sufficient for good recall.

SUMMARY

The present system, roughly described, relates to methods of finding images from a large corpus of images that at least partially match a query image. The present method makes use of feature detectors to bundle features into local groups or bundles. These bundled features are repeatable and much more discriminative than an individual SIFT feature. Equally importantly, the bundled features provide a flexible representation that allows simple and robust geometric constraints to be efficiently enforced when querying the index.

The present system employs a feature bundling and indexing engine to process images into bundled features. In one embodiment, an image is processed to identify SIFT keypoints and MSER regions. SIFT keypoints within the boundary of an MSER region are bundled together to form a bundled feature. It may happen that one SIFT feature belongs to multiple bundled features, or a SIFT feature may not belong to any bundled feature. A bundled feature is more discriminative than a single SIFT feature as it consists of multiple SIFT features. Unlike a single large feature (such as an MSER region alone), a bundled feature provides a flexible representation that allows partial matching of two bundles of SIFT features. Specifically, two matched bundled features are allowed to have large overlap error in their respective MSER regions, and to have a different number of SIFT features with only a subset of them matched. Thus, the more discriminative bundled feature is also robust to occlusion and other image variations induced by photometric and geometric changes, making it possible to achieve both high precision and recall.

Bundled features also allow the use of two geometric constraints when finding matches between a query and candidate images. The first geometric constraint is the membership of SIFT feature points within a bundled feature. The second geometric constraint is the 2D-layout ordering of the feature keypoints; namely the ordering of SIFT feature keypoints along an X-axis and along a Y-axis. This method enables efficient partial matching of two bundled features in a large scale image search system.

DETAILED DESCRIPTION

Figure 2:
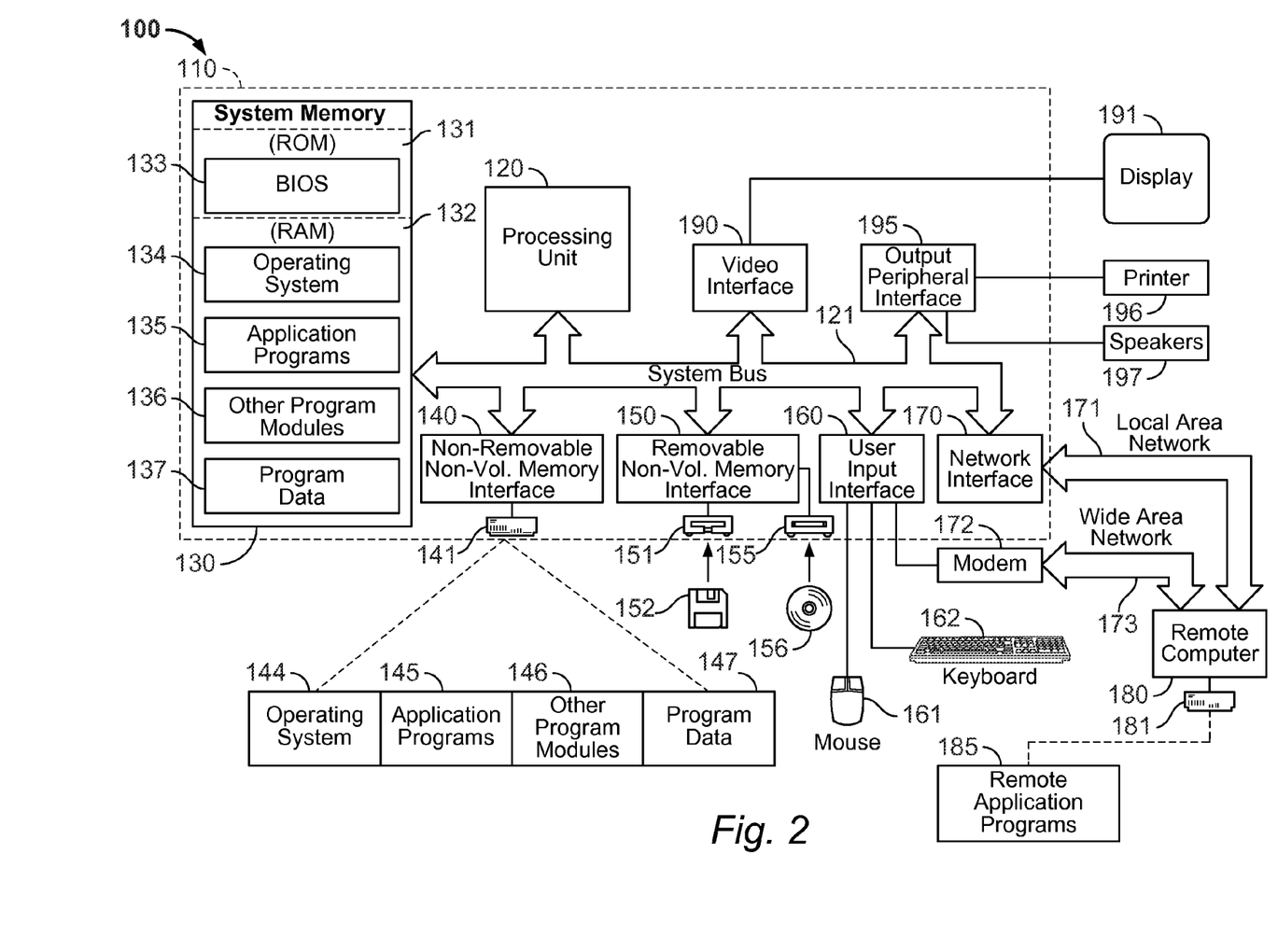
FIG. 2 is a block diagram of a sample computing environment for carrying out embodiments of the present system.

Embodiments of the invention will now be described with reference to FIGS. 2-9B, which in general relate to methods for finding images from a large corpus of images that at least partially match a query image. The methods described herein can be performed on a variety of processing systems. FIG. 2 illustrates an example of a suitable general computing system environment 100 for carrying out the methods of the present system. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing systems, environments or configurations. Examples of well known computing systems, environments and/or configurations that may be suitable for use with the invention include, but are not limited to, personal computers, server computers, multiprocessor systems, microprocessor-based systems, set top boxes, programmable consumer electronics, network PCs, minicomputers, mainframe computers, laptop and palm computers, smart phones and other hand held devices, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory, read only memory, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
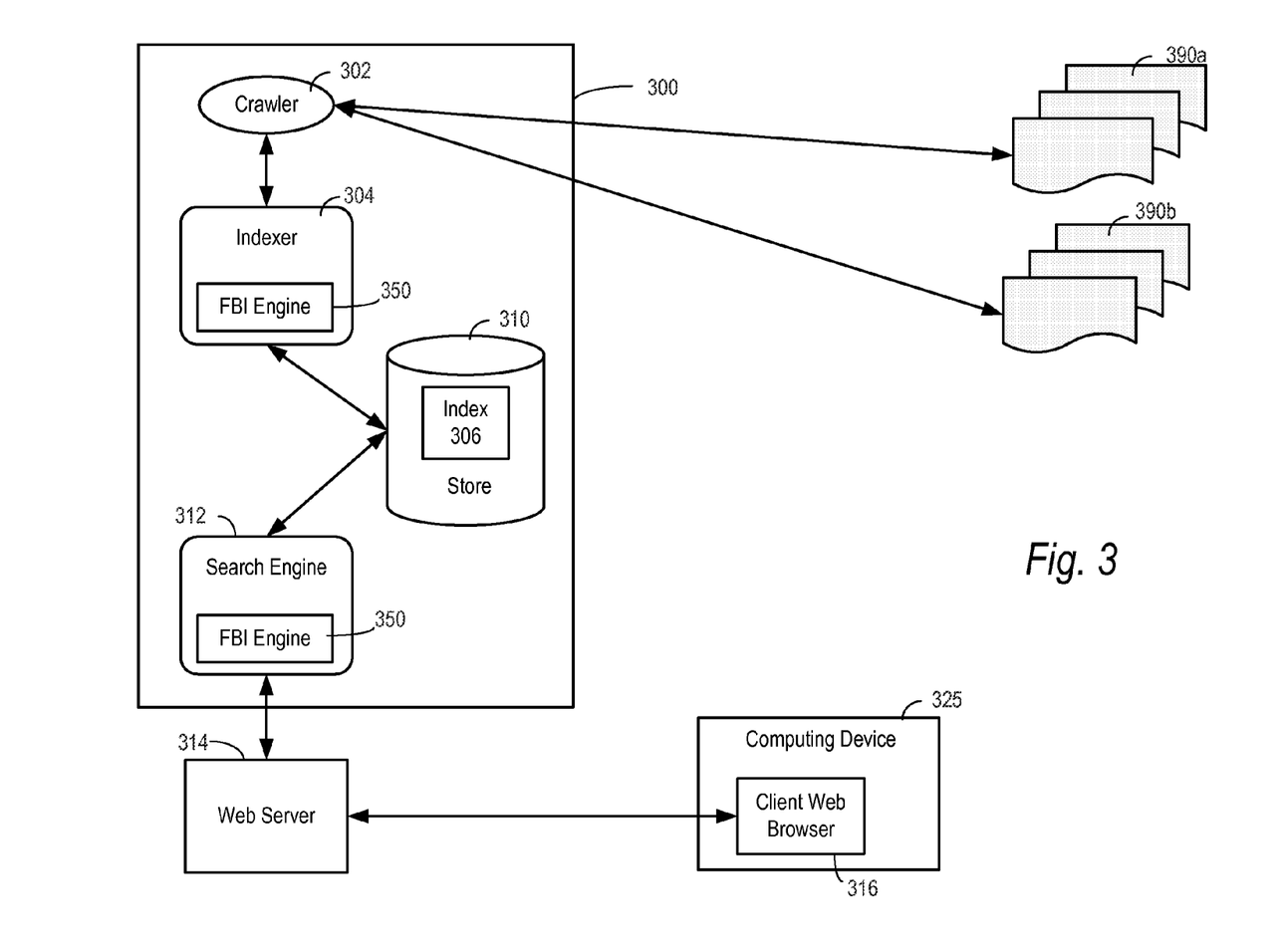
FIG. 3 is block diagram of a search engine including a feature bundling and indexing engine according to embodiments of the present system.

FIG. 3 is block diagram of an image search processing environment 300 including software modules and data structure on which the present system may be implemented. The image search processing environment 300 can operate with and/or as part of the computing system environment 100 described above. Image search processing environment 300 may be a crawler-based system having three major elements. First is the spider, also called the crawler 302. The spider visits a web page 390a, 390b, reads it, and then follows links to other pages within the site. The spider returns to the site on a regular basis to look for changes. The basic algorithm executed by the web crawler takes a list of seed URLs as its input and repeatedly: removes a URL from the URL list, determines the IP address of its host name, downloads the corresponding image document, and extracts any links contained in it. For each of the extracted links, the web crawler further translates it to an absolute URL (if necessary), and adds it to the list of URLs to download, provided it has not been encountered before.

An indexer 304 is provided for cataloging the images found by crawler 302 in an index 306. In accordance with the present system, indexer 304 includes a feature bundling and indexing (FBI) engine 350. Engine 350 is explained in greater detail below, but in general, it processes an image into local feature descriptors and quantizes the descriptors so that they may be indexed and stored in a manner analogous to text. In particular, the local feature descriptors are indexed into visual words. The visual words are stored in the index 306, as opposed to the actual pixels of the image. The operation of FBI engine 350 for processing images into visual words is explained hereinafter.

The visual words from the images identified by the spider 302 go into the index 306. The index 306, sometimes called the catalog, is a repository containing a copy of all the visual words and a reference to the source webpage that the spider finds. If a web page changes, then this book is updated with new information. The index is stored in a data store 310.

The third part of the search processing environment 300 is image search engine 312. This is the program that sifts through the millions of pages recorded in the index to find matches to a query image and ranks the matches in order of what it believes is most relevant. Searching through an index involves a user submitting a query image to the search engine 312. The search engine 312 includes an FBI engine as in the indexer 306 for processing a query image into local feature descriptors and quantizing the descriptors into visual words. The visual word representing the query image may then be compared by the search engine against the visual words stored in the index. The process for processing images into visual words, and comparing them to indexed visual words, is explained in greater detail below.

In practice, a user of a computing device 325 accesses search processing environment 300 via a web browser 316 on the client side and a web server 314 on the host side. Once a communication link is established between client and host, a user of computing device 325 may perform query searches as described above.

Figure 4:
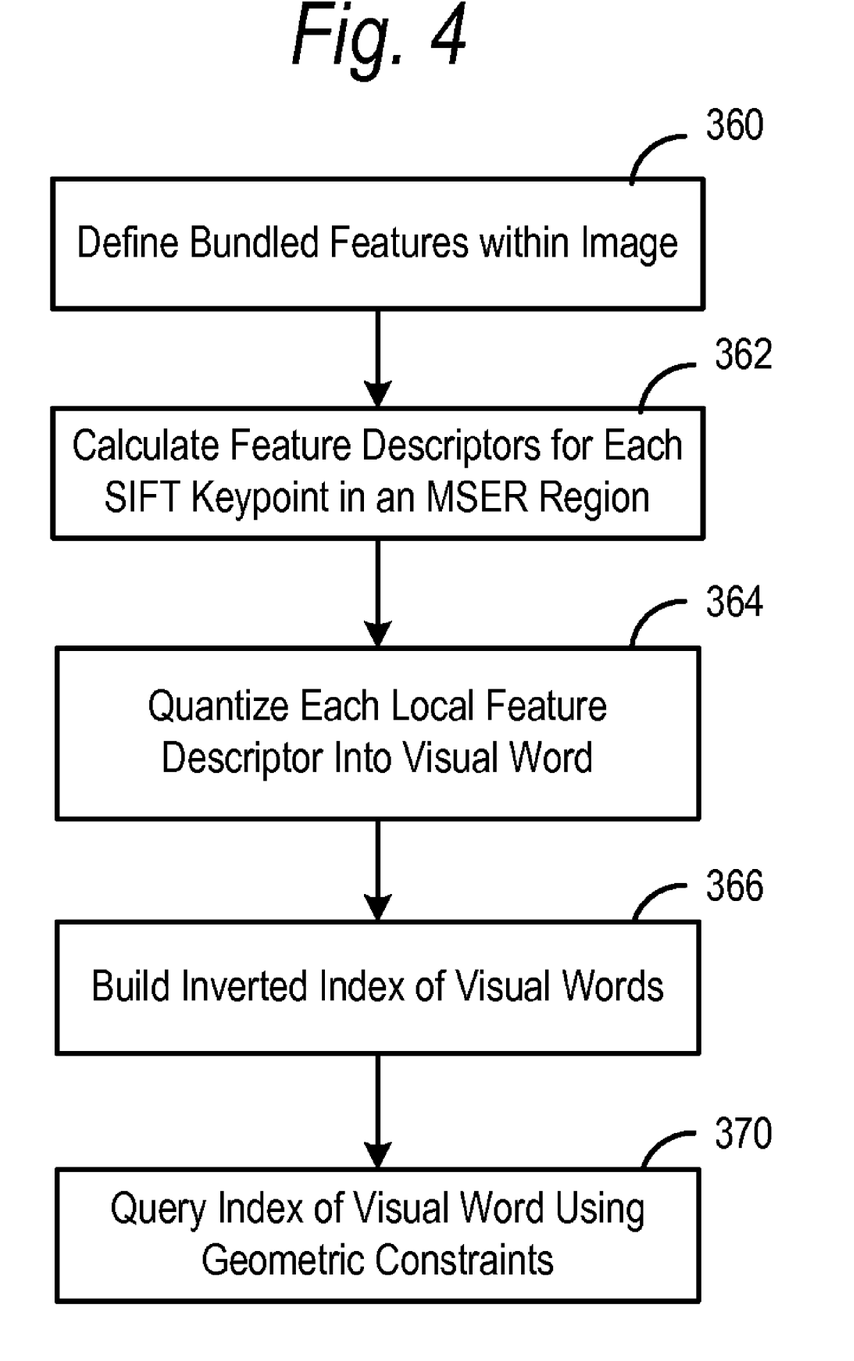
FIG. 4 is a flowchart of the operation of an embodiment of the present method.

The operation of FBI engine 350 in the indexer 304 and search engine 312 will now be explained in greater detail with reference to the flowchart of FIG. 4 and the diagrams of FIGS. 5-9B. In general, the FBI engine 350 employs a novel method of processing images into bundled features and local descriptors, and indexing these local descriptors in a way that results in higher precision in matching query and candidate images without requiring an expensive post-processing geometric verification step. In step 360, the FBI engine 350 identifies bundled local features within a stored or query image.

In particular, SIFT keypoints are determined for a given image, for example as explained in U.S. Pat. No. 6,711,293, previously incorporated by reference. MSER regions are also determined for the image, for example as explained in the paper by J. Matas, O. Chum, M. Urba, and T. Pajdla, "Robust Wide Baseline Stereo From Maximally Stable Extremal Regions," *Proc. of British Machine Vision Conference*, pages 384-396 (2002), previously incorporated by reference. One change is that the regions may be larger than described in the above-referenced paper. For example, in embodiments, the regions may be 1½ times larger than described in the above-referenced paper, though the increase in size may be greater or lesser than 1½ times in alternative embodiments. The regions may also be different shapes than that disclosed in the above-referenced paper.

Figure 5:
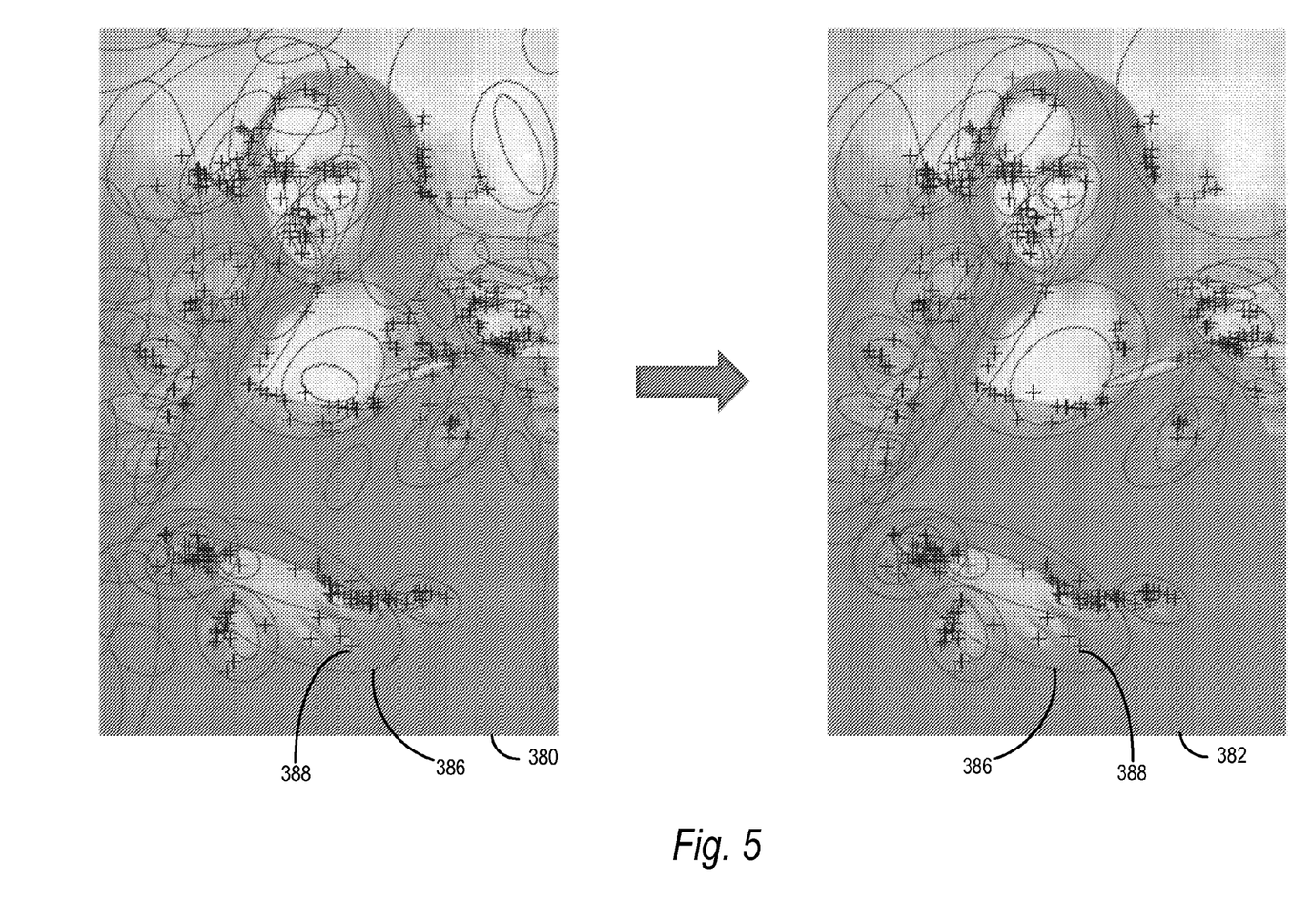
FIG. 5 is a graphic of a pair of images including bundled features and SIFT keypoints within the bundled features.

In accordance with the present system, SIFT keypoints within the boundary of an MSER region are bundled together. In particular, let S={$s_j$} denote the SIFT features and R={$r_i$} denote the MSER detections computed in an input image. A bundled feature B={$b_i$} is defined as:

$$b_i = \{s_j | s_j \propto r_i, s_j \in S\}, \quad (1)$$

where $s_j \propto r_i$ means that the point feature $s_j$ falls inside the region $r_i$. In general, bundled features are the SIFT features within a given MSER region. A bundled feature $b_i$ is discarded if it is empty (i.e., contains no SIFT keypoints). It may happen that one SIFT feature may belong to multiple bundled features (where the MSER regions overlap), or a SIFT feature may not belong to any bundled feature. FIG. 5 shows a query image 380 and a candidate image 382 both having bundled features comprised of MSER regions 384 and SIFT keypoints (also referred to as feature points) 388. An MSER detection whose ellipse spans more than half the width or height of the image may be discarded, since such large regions are generally not repeatable.

A bundled feature is more discriminative than a single SIFT feature as it consists of multiple SIFT features. Unlike a single large feature (such as MSER regions alone), a bundled feature provides a flexible representation that allows partial matching of two groups of SIFT features. Specifically, two matched bundled features are allowed to have large overlap error in their respective MSER regions, and to have a different number of SIFT features with only a subset of them matched. Thus, the more discriminative bundled feature is also robust to occlusion and other image variations induced by photometric and geometric changes, making it possible to achieve both high precision and recall.

As explained below, two geometric constraints are used when finding matches between a query and candidate images: 1) the common membership of SIFT feature points within respective bundled features; and 2) the 2D-layout ordering of the feature points (that is, the ordering of SIFT feature points along an X-axis and along a Y-axis). This method enables efficient partial matching of two bundled features in a large scale image search system as described below.

After bundled features are defined in step 360, a SIFT descriptor is defined for each local keypoint within a bundle in step 362. A SIFT descriptor is a 128 dimensional vector computed as a set of orientation histograms on (4×4) pixel neighborhoods. The orientation histograms are relative to the keypoint orientation and the orientation data comes from the Gaussian image closest in scale to the keypoint's scale. The contribution of each pixel is weighted by the gradient magnitude, and by a Gaussian with σ 1.5 times the scale of the keypoint. Histograms contain 8 bins each, and each descriptor contains a 4×4 array of 16 histograms around the keypoint. This leads to a SIFT descriptor vector with 4×4×8=128 elements. This vector is normalized to enhance invariance to changes in illumination. Upon completion of step 362, each SIFT point within a bundle is defined by an X,Y position within the bundle (relative to other SIFT points in the bundle) and a 128 dimensional SIFT descriptor.

In step 364, the SIFT descriptor for each SIFT feature in a bundle is used to form visual words. In particular, each descriptor is vector-quantized into visual words. To build the visual word vocabulary for feature quantization, a hierarchical k-means algorithm may be used to recursively group the SIFT features into, for example, one million clusters, each cluster center in the hierarchical k-means tree is taken as a visual word. Details relating to the hierarchical k-means algorithm are set forth for example in D. Nister and H. Stewenius, "Scalable Recognition with a Vocabulary Tree," *In Proc. CVPR* (2006), which paper is incorporated by reference herein in its entirety.

A SIFT feature may be quantized to its nearest, one or more, visual words. Unlike previous approaches where a feature is quantized using the hierarchical k-means tree, a k-d tree is used in embodiments of the present method to organize the leaves (visual words) in the hierarchical k-means tree. Details relating to a k-d tree in this context are explained for example in J. Philbin, O. Chum, M. Isard, J. Sivic, and A. Zisserman, "Object Retrieval with Large Vocabularies and Fast Spatial Matching," *In Proc. CVPR* (2007), which paper is incorporated by reference herein in its entirety. By using a k-d tree, it is possible to: 1) achieve better quantization by finding better nearest neighbors, and 2) flexibly insert new visual words that are not well represented by the existing vocabulary. To approximate the lost information caused by quantization, a 24-bit cell-dependent hamming code may be used to encode the difference between the features and their quantization results.

In step 366, the FBI engine 350 next builds an inverted index of visual words from the visual words formed in step 364. The visual word, together with its image ID, 24-bit hamming code, and geometric information (including group ID for group membership and 2D ordering information), are stored in the index 306. Two formats may be used for the index. One is the traditional inverted hit list where each visual word is followed by a list of document IDs. A second format uses a global location space, where each word is followed by the global locations assigned to each of its appearances in the images. Special metawords, such as EndDoc (end of document), are used to mark the boundary between two images in the location space. The latter format enables simultaneous index query and geometric constraint enforcement in an efficient manner.

Figure 6:
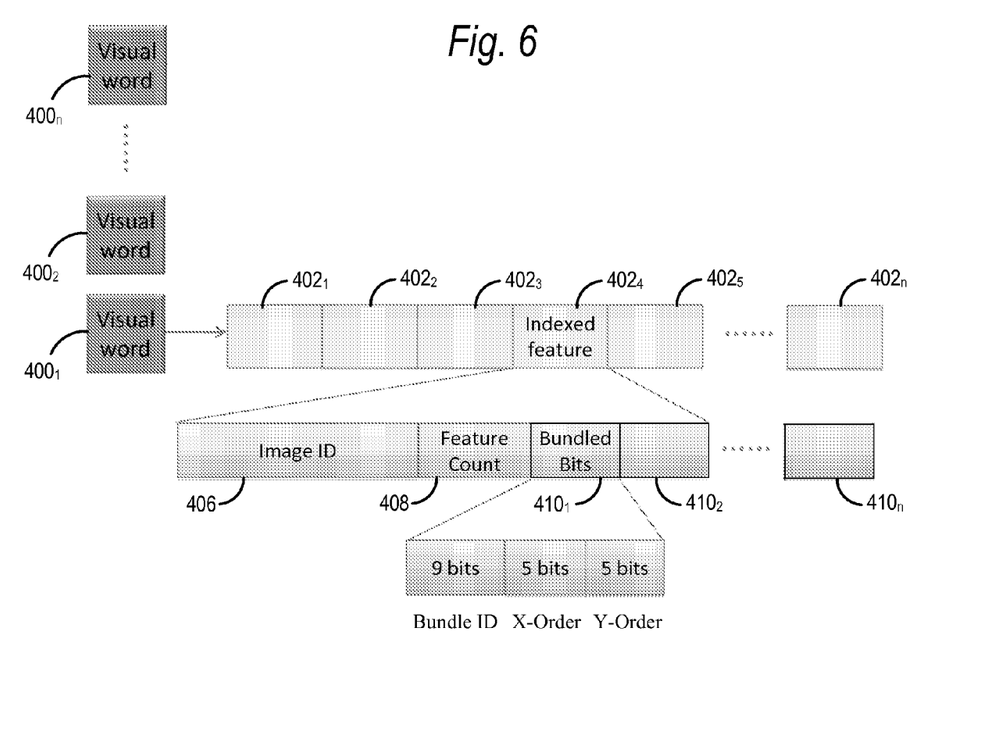
FIG. 6 is a block diagram of an inverse index of visual words processed from images according to the present method.

FIG. 6 shows the structure of an inverted index hit list where each visual word is followed by a list of document IDs. In FIG. 6, there are a plurality of visual words $400_1$, $400_2, \ldots, 400_n$ formed by quantizing the SIFT descriptors of each SIFT feature in a bundle, across multiple bundles and across multiple images. Where SIFT descriptors of more than one SIFT feature in an image are close, more than one SIFT descriptor from that image may be quantized into the same visual word. Similarly, where SIFT descriptors of SIFT features in different images are close, those SIFT descriptors from different images may similarly be quantized into the same visual word. Accordingly, each visual word 400 includes a number of indexed feature storage locations $402_1$, $402_2, \ldots, 402_n$.

In general, each indexed feature 402 for a given visual word is an index showing where that visual word appears in a given image. There will be one indexed feature location 402 for each image including that visual word. Moreover, all occurrences of the visual word within that image will also be represented by the single indexed feature location 402. Thus, as shown for example with respect to indexed feature $402_4$, if a visual word appears in a given image, a feature index 402 will be created including the image ID 406. The feature image will also indicate all occurrences of that visual word within that image. In particular, feature count 408 lists the number of occurrences of a visual word within each bundled feature. As a given keypoint may exist in more than one overlapping bundled feature, it is possible that the feature count exceeds the absolute number of keypoints for a visual word within a given image. An example explaining this in more detail is shown below with respect to FIG. 7.

For each occurrence 1-n of the visual word in the bundled features of an image indicated by the feature count 408, the feature index 402 further includes bundled bits $410_1$, $410_2, \ldots, 410_n$ indicating the geometric information of the visual word within each bundled feature. The bundled bits 410 for each occurrence of the visual word in a bundled feature includes 9 bits for identifying the bundled feature within the image, 5 bits indicating the position of the word along an X-axis, and 5 bits indicating the position of the word along the Y-axis.

Figure 7:
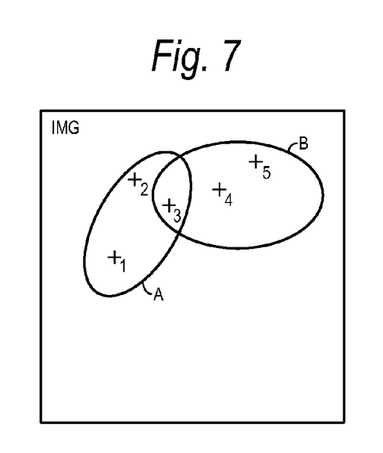
FIG. 7 is a graphic of an image including a pair of bundled features and SIFT keypoints within the bundled features.

FIG. 7 illustrates an example of an image with an identifier IMG having five keypoints (1-5). All of these keypoints 1-5 have descriptors that are all quantized into the same visual word P. (This example is for illustrative purposes, and it may be rare that all five of these local points would be quantized into the same word). These five keypoints belong to two bundled MSER regions A and B, each region having three points (point #3 appears in both regions A and B). There are no other occurrences of the visual word P in image IMG.

Figure 8:
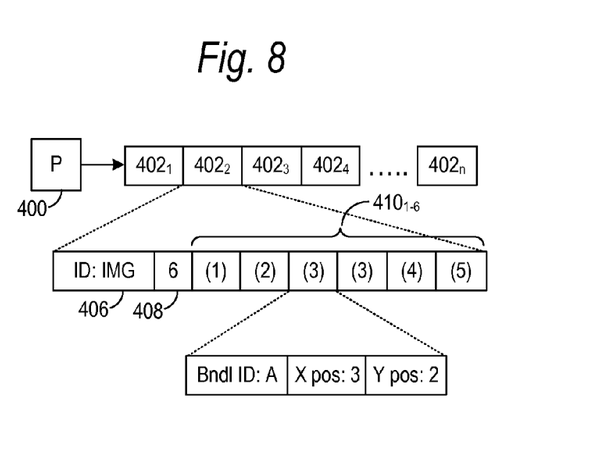
FIG. 8 is a block diagram of an inverse index of a visual word included in the image of FIG. 7.

FIG. 8 indicates the indexing for the visual word P in the example of FIG. 7. The visual word P may appear in other images, so there are a plurality of indexed features $402_{1-n}$. One of them ($402_2$) is for image IMG. As shown, the indexed feature $402_2$ for image IMG includes an image identifier 406 and a feature count 408 for all occurrences of visual word P in each bundled feature in FIG. 7. Even though there are only 5 SIFT keypoints, as the two MSER regions A and B overlap and keypoint 3 is in both regions, bundled feature A includes three keypoints (1-3), each quantized into visual word P, and bundled feature B includes three keypoints (3-5), each quantized into visual word P. There is a bundled bits $410_{1-6}$ for each occurrence of the word P in the two bundled feature regions A and B. The bundled bits $410_3$ includes 19 bits representing the bundle ID and X,Y position of the keypoint 3 in region A. As shown, the bundle ID is bundle A, the X position is 3 (it is positioned third along the X-axis relative to the other keypoints in bundle A) and the Y position is 2 (it is positioned second along the Y-axis relative to the other keypoints in bundle A).

The format of 19 bits in the bundled bits 410 supports at most 512 bundled features per image. If an image contains more than 512 bundles, the bundles containing the fewest features may be discarded to remain within this limit. If a bundle contains more than 32 features, the ordinals denoting order are projected onto the range [0, 31] to fit into 5 bits, so adjacent features may end up mapped to the same position in the order. If two bundled features have greater than 97% overlap in their constituent SIFT features, only one bundled feature may be indexed. It is understood that the bundled bits 410 may include more or less than 19 bits, and that there may be more or less than 512 bundled features, in alternative embodiments.

The feature bundling and indexing engine 350 (FIG. 3) within indexer 304 processes all images identified by the crawler 302, and stores all of the inversely indexed visual words within the index 306. Once a query image is received, it is processed as described above by the feature bundling and indexing engine 350 in the search engine 312. Thereafter, the index 306 of visual words may be queried by the search engine (step 370, FIG. 4) to find matches to the processed query image.

The FBI engine 350 maps two weak geometric constraints into the visual words formed of the candidate and query images. The following explains how to exploit the two mapped weak geometric constraints for efficient partial matching of bundled features. First, SIFT features that are bundled in the query image should typically match with corresponding SIFT features in a target image that also reside in a common bundle. In embodiments, a match of two or more SIFT features between query and target images is sufficient. Second, the relative spatial configuration of the SIFT features within one bundled feature (along the X and Y axes) should remain approximately the same in query and target images and this geometric constraint is used to further improving matching. These operations are explained in greater detail below.

In matching bundled features between query and candidate images, let $p=\{p_i\}$ and $q=\{q_j\}$ be two bundled features with quantized visual words $p_i, q_j \in W$, where W is the visual vocabulary. First, $\{p_i\}$ and $\{q_j\}$ are sorted in a geometric order (as explained below). Next, any $p_i \in p$ is discarded that does not have a matching $q_i \in q$. Then for each remaining visual word $p_i$ in the bundled feature p, the matched visual word $q^*(p_i)$ is found in the bundled feature q and the order of $q^*(p_i)$ in q is denoted by $O_q[p_i]$.

Now, a matching score M(q; p) is defined between p and q. The score M(q; p) consists of a membership term $M_m$(q; p) and a geometric term $M_g$(q; p):

$$M(q;p) = M_m(q,p) + \lambda M_g(q;p), \quad (2)$$

where $\lambda$ is a weighting parameter.

The number of common visual words between two bundled features may be used to define a membership term $M_m$(q, p):

$$M_m(q,p) = |\{p_i\}|. \quad (3)$$

This term gives a higher score for matched bundles with more common visual words, enforcing a weak spatial consistency.

This score is not normalized by the total number of matched and unmatched features in p and q so regions with many matching features score higher than regions with fewer matching features, even if the proportion of features that match is higher in the latter case. The feature score may be normalized in alternative embodiments.

A geometric term may be defined for performing a weak geometric verification between two bundled features p and q using relative ordering:

$$M_g(q, p) = -\sum_i \delta(O_q[p_i] > O_q[p_{i+1}]), \quad (4)$$

where $\delta(O_q[p_i] > O_q[p_{i+1}])$ is an indicator function that measures the consistency between the order i<i+1 (before matching) and the order $(O_q[p_i] > O_q[p_{i+1}])$ (after matching). In other words, geometric inconsistency (as defined by the ordering) of the matching is penalized between two bundled features. The absolute ordered rank of matched SIFT features are not compared. Instead, only the relative ordering relationship is used since it is more robust to inconsistencies resulting from partial matches of features between bundles.

In order to improve the precision of the matching operation, the present method makes use of a further geometric constraint, i.e., the geometric order of the keypoints in the bundled features. Since there is no significant rotation between duplicate images for the purposes of the present method, the X- and Y-coordinates of $\{p_i\}$ and $\{q_j\}$ may be used to define the geometric order:

$$M_g(q,p) = \min(M_g^x(q;p), M_g^y(q;p)), \quad (5)$$

where $M_g^x(q; p)$ is computed by sorting $\{p_i\}$ and $\{q_j\}$ according to their X-coordinates, and $M_g^y(q; p)$ by sorting their Y-coordinates. In alternative embodiments, the generalization to handle larger rotations is straightforward, e.g. by ordering features along the dominant orientation of the bundling MSER detection.

Figure 9A:
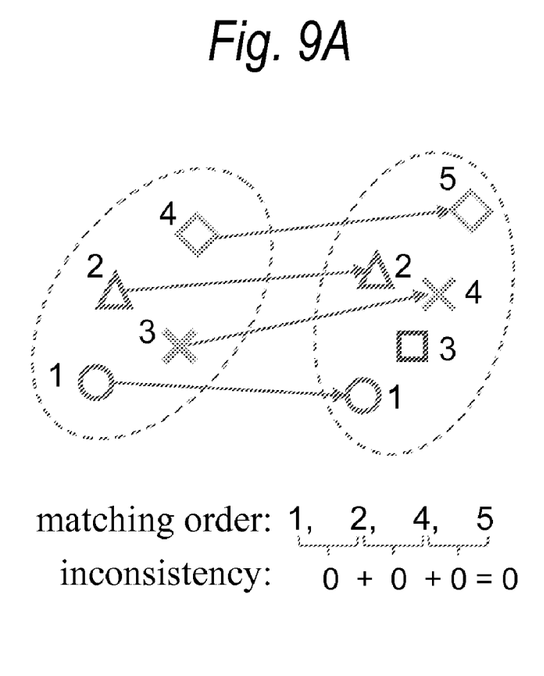
FIGS. 9A and 9B are graphics of a pair of images including bundled features and SIFT keypoints within the bundled features, where the SIFT keypoints are correlated between images with respect to the position of SIFT keypoints along a vertical Y-axis.
Figure 9B:
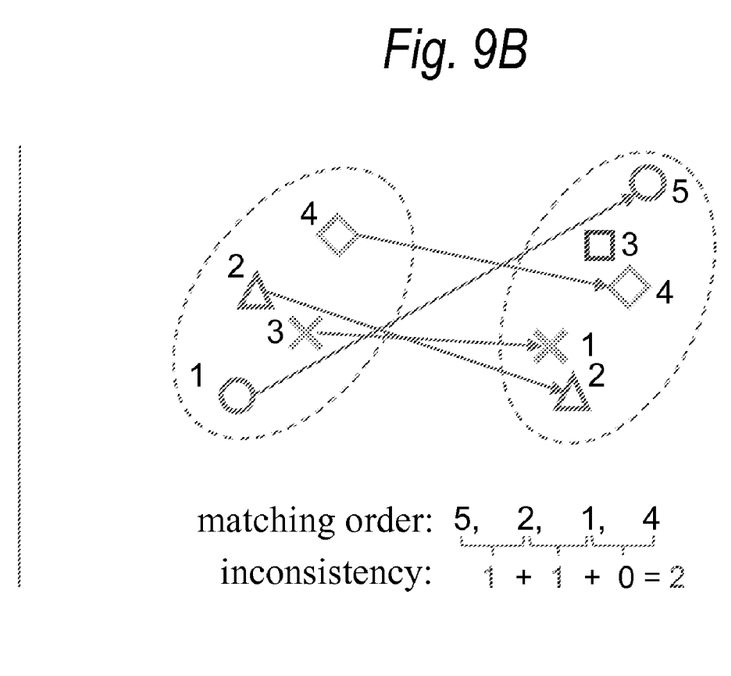

FIGS. 9A and 9B show two matching pairs of bundled features. In the correctly matching case of FIG. 9A, the geometric score with respect to horizontal positioning along the X-axis is M(q; p)=4−0=4. In the more mismatched case of FIG. 9B, there are four matched features of which two are in reversed relative orders, leading to a lower score M(q; p)=4−2=2 (where in this example λ=1). While embodiments of the present system obtain scores for both vertical positioning along the Y-axis and horizontal positioning along the X-axis, it is understood that geometric constraints along only one of the X or Y axes may be used in an alternative embodiment.

The definition of matching score in Equation (2) is general, showing particular implementation choices of $M_m(q, p)$ and $M_g(q, p)$ for one embodiment of the present method. It will be appreciated, however, that other suitable forms may be defined for other image retrieval applications.

When retrieving images that are matches to a query image, image retrieval is formulated as a voting problem. Each visual word in the query image votes on its matched images. The matched images are ranked by the sum of weighted votes. Suppose a query visual word and its matched visual word belong to the bundled feature p in the query image and the bundle feature q in the matched image respectively. This vote is weighted using the matching score between two bundled features:

$$v = v_{tfidf} M(q;p), \quad (6)$$

where $v_{tfidf}$ is standard tf-idf (term frequency-inverse document frequency) weight and v is the final weight. Calculation of standard tf-idf weights are known and discussed for example in J. Sivic and A. Zisserman, "Video Google: A Text Retrieval Approach to Object Matching in Videos," *In Proc. ICCV* (2003), previously incorporated by reference. Thus features that occur as part of spatially consistent groups across the two images score more highly. Such a method represents an improvement over the bag-of-words model with a weak local geometric matching.

Embodiments of the present method introduce bundled features for large scale partial duplicate web image search. Bundled features are a flexible representation with several desirable properties. First, they are more discriminative than individual SIFT features. Second, they allow simple and robust geometric constraints to be enforced at the bundle level. Finally, they allow two groups of SIFT features to be partially matched, improving robustness to occlusion and image variations induced by photometric and geometric changes. Embodiments of the present method use an MSER detection to bundle SIFT features. However, it is understood that other bundling approaches could be applied. As a flexible representation that is capable of partial matching, bundled features are also attractive for image-based object retrieval.

Embodiments of the present system are capable of identifying matches and partial matches to query images without the necessity of expensive post-processing geometric verification. However, it is understood that a post-processing geometric verification step may be used in alternative embodiments. If so, the list of image candidates on which the post-processing geometric verification is performed would be much smaller than in conventional systems.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method of processing an image to enable indexing and comparison of the image against other similarly processed images, the method comprising the steps of:
   (a) identifying local regions of interest within the image by a first feature detection scheme, where by the first feature detection scheme comprises the step of identifying local regions of interest within the image by (MSER) maximally stable extremal regions;
   (b) identifying local points of interest within the image by a second feature detection scheme;
   (c) defining bundled features by grouping together the local points of interest that occur within a given local region of interest; and
   (d) comparing bundled features of a first image to bundled features of a second image to determine if the first and second images are at least partial matches of each other.

2. The method of claim 1, wherein said step (b) of identifying local points of interest within the image by a second feature detection scheme comprises the step of identifying local points of interest within the image by (SIFT) scale invariant feature transform.

3. The method of claim 1, wherein said step (d) of comparing bundled features of a first image to bundled features of a second image comprises the step of finding a bundled feature in the first image and a bundled feature in the second image that share at least two common local points of interest.

4. The method of claim 1, wherein said step (d) of comparing bundled features of a first image to bundled features of a second image comprises the steps of determining the relative positions of local points of interest along first and second perpendicular axes within bundles in the first and second images, and comparing the relative positions between bundles in the first and second images.

5. The method of claim 1, further comprising the step of defining a feature descriptor for each local point of interest within a bundled feature.

6. The method of claim 5, further comprising the step of quantizing the feature descriptor for each local point of interest into one or more visual words.

7. The method of claim 6, further comprising the step of indexing the one or more visual words by storing a visual word together with an inverse hit list of all bundled features within which the visual word appears.

8. The method of claim 6, further comprising the step of indexing the one or more visual words by storing a visual word together with an inverse hit list using a global location space, wherein each word is followed by the global locations assigned to each of its appearances in the images.

* * * * *